(12) United States Patent
Kivits et al.

(10) Patent No.: US 8,004,942 B1
(45) Date of Patent: Aug. 23, 2011

(54) METHOD AND APPARATUS FOR READING

(75) Inventors: Peter Kivits, Waalre (NL); Luc Segers, Peer (BE)

(73) Assignee: Marvell International, Ltd., Hamilton (BM)

( * ) Notice: Subject to any disclaimer, the term of this patent is extended or adjusted under 35 U.S.C. 154(b) by 580 days.

(21) Appl. No.: 12/106,706

(22) Filed: Apr. 21, 2008

Related U.S. Application Data (60) Provisional application No. 60/913,074, filed on Apr. 20, 2007.

(51) Int. Cl.
*G11B 20/10* (2006.01)

(52) U.S. Cl. .................. 369/47.53; 369/53.31

(58) Field of Classification Search ............ 369/44.29, 369/47.53, 53.28, 53.31, 53.34
See application file for complete search history.

(56) References Cited

U.S. PATENT DOCUMENTS

| | | | | |
|---|---|---|---|---|
| 5,574,706 A | * | 11/1996 | Verboom et al. | 369/44.26 |
| 6,487,146 B1 | * | 11/2002 | Verboom | 369/44.25 |
| 7,436,745 B2 | * | 10/2008 | Kim | 369/47.53 |
| 7,545,709 B2 | * | 6/2009 | Takaba | 369/44.29 |
| 7,623,420 B2 | * | 11/2009 | Bahng | 369/47.1 |
| 2004/0066716 A1 | * | 4/2004 | Yu | 369/44.29 |
| 2007/0064561 A1 | * | 3/2007 | Yu et al. | 369/47.53 |
| 2007/0242580 A1 | * | 10/2007 | Kikugawa et al. | 369/53.12 |
| 2008/0094972 A1 | * | 4/2008 | Van Endert | 369/47.53 |
| 2008/0205210 A1 | * | 8/2008 | Van Endert et al. | 369/44.27 |
| 2009/0122680 A1 | * | 5/2009 | Van Endert et al. | 369/53.44 |
| 2009/0262616 A1 | * | 10/2009 | Tang et al. | 369/47.53 |
| 2009/0316544 A1 | * | 12/2009 | Van Endert | 369/47.53 |

OTHER PUBLICATIONS

Taguchi Design Tutorial downloaded from website http://www.statease.com/ebug/DE05-Taguchi.pdf dated Jan. 10, 2001.*

* cited by examiner

*Primary Examiner* — Wayne R Young
*Assistant Examiner* — Brenda Bernardi (57) ABSTRACT

Aspects of the disclosure provide a method to efficiently calibrate parameters of a memory reading device. The method can include defining two or more value sets for the parameters of the memory reading device to read a memory medium, reading the memory medium with the parameters set respectively at the value sets, receiving performance signals corresponding to operation of the memory reading device having the parameters set at the value sets, respectively, and setting the parameters of the memory reading device for reading the memory medium based on the performance signals.

27 Claims, 6 Drawing Sheets

METHOD AND APPARATUS FOR READING

INCORPORATION BY REFERENCE

This application claims the benefit of U.S. Provisional Application No. 60/913,074, "PROCEDURE FOR THE OPTIMUM READ STRATEGY CALIBRATION OF OPTICAL DRIVES" filed on Apr. 20, 2007, which is incorporated herein by reference in its entirety.

BACKGROUND

Generally, information that is stored in a memory medium can be read by a memory reading device. Both the memory medium and the memory reading device can affect a reading quality of the stored information. The memory medium, such as hard disk, DVD, CD, and the like, may have different properties due to various reasons, such as different manufacturers, different models, variations in the manufacturing and materials, and the like. On the other hand, the memory reading device may also have different properties due to manufacturing variations, environmental variations, operational variations, and the like. In order to account for the variations in the properties, various parameters of the memory reading device can be adjusted to achieve a high reading quality. Further, to account for different portions of the memory medium having different properties, the parameters of the memory reading device may be adjusted during reading the memory medium to achieve the high reading quality.

SUMMARY

Aspects of the disclosure can provide a method to efficiently calibrate parameters of a memory reading device. The method can include defining two or more value sets for the parameters of the memory reading device to read a memory medium, reading the memory medium with the parameters set respectively at the value sets, receiving performance signals corresponding to operation of the memory reading device having the parameters set at the value sets, respectively, and setting the parameters of the memory reading device for reading the memory medium based on the performance signals.

Further, the method can include determining an optimum value set based on the performance signals. Additionally, the method can include verifying the optimum value set of the parameters by reading the memory medium with the parameters of the memory reading device set at the optimum value set.

To determine the optimum value set, the method can select the optimum value set from the value sets based on the performance signals. Alternatively, the method can build a model of the performance signals to the parameters, and determine the optimum value set based on the model. The model may include at least one of a linear model, a parabolic model and a paraboloid model.

The parameters may include at least one of a focus offset, a radial offset, a tilt angle, a collimator position, a gain of an amplifier and a bandwidth of a preamplifier. To define the two or more value sets for the parameters, the method can include defining the value sets of the parameters according to a design of experiments (DOE) methodology, such as according to a Taguchi table.

The performance signals can include at least one of a mean square of phase errors (MSE), a jitter, a radial error amplitude, a pseudo sync count, main beam push pull amplitude (MBPP), side beam push pull amplitude (SBPP), differential push pull amplitude (DPP), viterbi margin metric (VMM), wobble quality metric, and adip error. Additionally, the performance signals can include a weighted combination of at least one of a mean square of phase errors (MSE), a jitter, a radial error amplitude, a pseudo sync count, main beam push pull amplitude (MBPP), side beam push pull amplitude (SBPP), differential push pull amplitude (DPP), viterbi margin metric (VMM), wobble quality metric, and adip error.

According to the disclosure, the memory medium can include at least one of a hard disk, a BLU-RAY disc, a CD and a DVD.

Aspects of the disclosure may also provide an apparatus for reading a memory medium. The apparatus can include a reading unit configured to receive reading signals from the memory medium, and a controller coupled to the reading unit, the controller being configured to define two or more value sets for parameters of the reading unit to read the memory medium, set the parameters of the reading unit according to the value sets, receive performance signals corresponding to operation of the reading unit having the parameters set at the value sets, and set the parameters of the reading unit for reading the memory medium based on the performance signals.

Additionally, the disclosure may provide a processor for calibrating a memory reading device to read a memory medium. The processor may include a memory reading device interface coupled to the memory reading device, the memory reading device interface being configured to provide the memory reading device a value set for setting parameters of the memory reading device, and receive reading signals from the memory reading device, and a processor unit coupled to the memory reading device interface, the processor unit being configured to define two or more value sets for the parameters of the memory reading device to read the memory medium, transmit the two or more value sets to the memory reading device interface respectively, measure performance signals from the reading signals corresponding to operation of the memory reading device having the parameters set at the value sets, and determine the parameters of the memory reading device for reading the memory medium based on the performance signals.

Aspects of the disclosure may also provide a device. The device can include a processor configured to process data from a memory medium, a reading unit coupled to the processor, the reading unit being configured to read the data from the memory medium and provide the data to the processor, and a controller coupled to the reading unit, the controller being configured to define two or more value sets for parameters of the reading unit to read the memory medium, set the parameters of the reading unit according to the value sets, receive performance signals corresponding to operation of the reading unit having the parameters set at the value sets, and set the parameters of the reading unit for reading the memory medium based on the performance signals.

BRIEF DESCRIPTION OF THE DRAWINGS

Various exemplary embodiments of this disclosure will be described in detail with reference to the following figures, wherein like numerals reference like elements, and wherein.

DETAILED DESCRIPTION OF EMBODIMENTS

Figure 1:
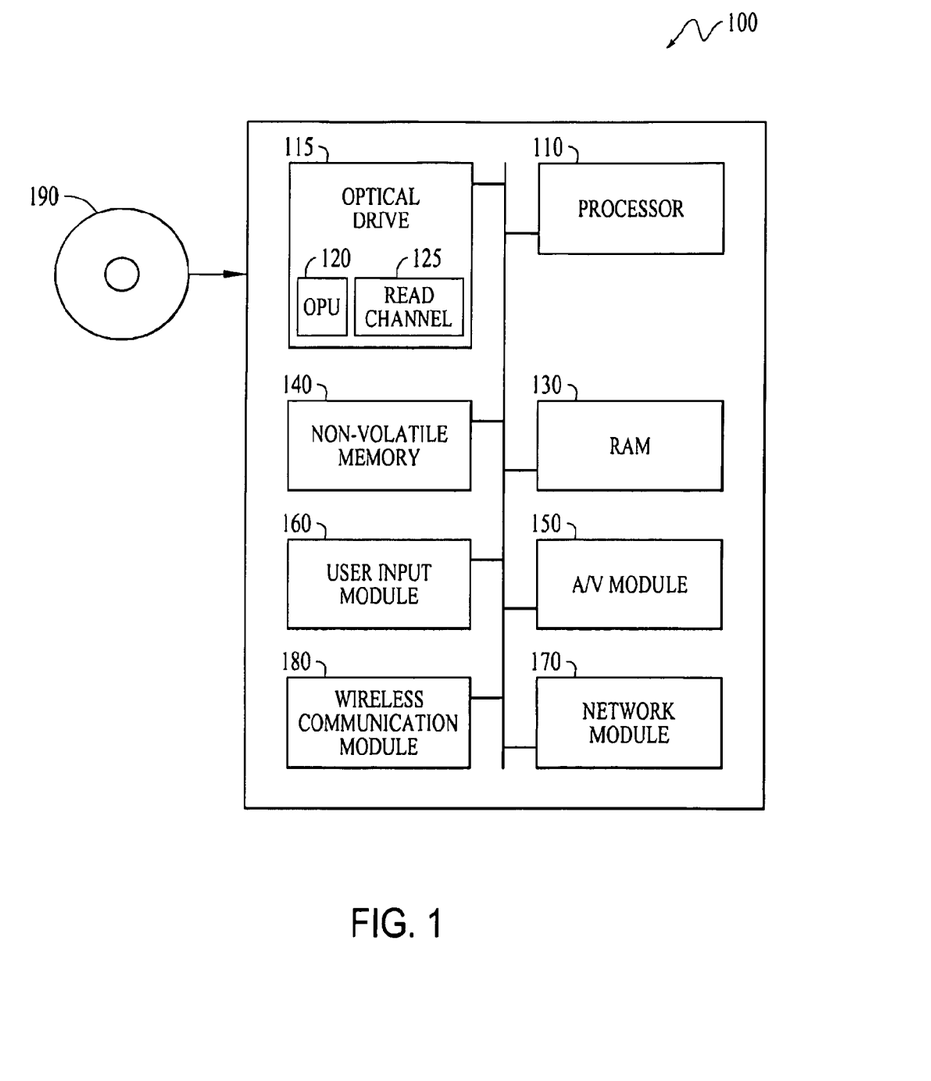
FIG. 1 shows a block diagram of an exemplary memory device.

FIG. 1 shows a block diagram of an exemplary medium device that can operate according to the disclosure. The memory device 100 can include a processor 110, an optical drive 115, a RAM unit 130, and a non-volatile memory 140. These elements can be coupled together as shown in FIG. 1.

The optical drive 115 can also include an optical pickup unit (OPU) 120, which can receive reading signals from a memory medium, such as an optical disc 190. The optical disc 190 may store data, such as video data, audio data, instruction data, control data, and the like. Generally, the data can be stored in a binary form as a series of binary digits 1 and 0. The binary digits 1 and 0 can be differentiated by a reflectivity difference.

The reflectivity difference can be detected by the OPU 120. For example, the OPU 120 may direct a laser beam onto a location of the optical disc 190. The laser beam can be reflected by the location. The reflected laser beam may have a light intensity that can be associated with a reflectivity of the location. Further, the light intensity may be detected by a detector of the OPU 120. The detector may generate an electrical signal, such as a voltage signal, corresponding to the light intensity. Therefore, a property of the electrical signal, such as an amplitude of the voltage signal, may correspond to the reflectivity at the location, which can differentiate 1 or 0 stored at the location.

Various factors can affect the property of the electrical signal, and thus affect a reading quality. For example, whether the laser beam is focused at a surface of the optical disc 190 may affect the light intensity of the reflected laser beam. For another example, whether the laser beam is focused at a center of a data track may also affect the light intensity of the reflected laser beam.

In an example, a surface of the optical disc 190 may be tilted, for example, due to particles on a supporting plate or a disc thickness variation. Thus, the light intensity of the reflected laser beam can be affected. In a compensation technique, a tilt angle of the incoming laser light to the surface can be adjusted. In another example, the laser light may pass through a collimator lens, and a position of the collimator lens may affect the light intensity.

In addition, the optical drive 115 may include a read channel 125 that can be configured to extract a digital signal from the electrical signal generated by the detector. The read channel 125 can include various electrical components, such as amplifiers, equalizers, and the like. Various factors of the electrical components, such as a gain of an amplifier, a bandwidth of an equalizer, and the like, can also affect the reading quality.

The processor 110 can execute system and application codes, more specifically, execute data operations according to commands. The non-volatile memory 140 can hold information even when power is off. Therefore, the non-volatile memory 140 can be used to store system and application codes, such as firmware. The RAM unit 130 is readable and writeable. Generally, the RAM unit 130 can have a fast access speed. It can be preferred that data and codes are stored in the RAM unit 130 during operation, such that the processor 110 can access the RAM unit 130 for the codes and the data instead of the non-volatile memory 140.

The memory device 100 can efficiently calibrate parameters for controlling the optical drive 115 to read the optical disc 190 with a high reading quality. More specifically, the memory device 100 can define value sets for parameters that can be adjusted. Further, the memory device 100 can set the parameters according to the defined value sets and read the optical disc 190. Accordingly, the memory device 100 can receive performance signals corresponding to the optical drive being operated at the value sets. Subsequently, the memory device 100 can determine an optimum value set and set the parameters accordingly to read the optical disc 190.

In an embodiment, the calibration method can be implemented as a calibration algorithm, which can be included in firmware as software codes. The firmware can be stored in the non-volatile memory 140. During operation, the processor 110 can be actuated to execute the calibration algorithm in various scenarios, such as before an official reading of the optical disc 190, when a low read quality is detected, and the like. The software codes of the calibration algorithm can be loaded from the non-volatile memory 140 to the RAM unit 130. Then, the processor 110 can access the RAM unit 130 to execute the software codes. The software codes can enable the processor 110 to efficiently calibrate an optimum value set for the parameters that can achieve a high reading quality.

It should be understood that the memory device 100 may include more than one processor 110. Further, the non-volatile memory 140 may include various non-volatile memory devices, such as battery backup RAM, read only memory (ROM), programmable ROM (PROM), flash PROM, electrical erasable PROM (EEPROM) magnetic storage, optical storage, and the like. Some non-volatile memory 140 can be updated, such as various types of PROM. The RAM unit 130 may also include various RAM devices, such as DRAM, SRAM and the like.

In another embodiment, the calibration algorithm can be implemented in a hardware circuit component, such as FPGA, ASIC, and the like. The hardware circuit component can control the optical drive 115 to calibrate an optimum value set of the parameters that can achieve a high reading quality. Furthermore, the calibration algorithm can be implemented as a combination of software codes and a hardware circuit component to perform according to the disclosure.

For the ease and clarity of description, the embodiments are presented with a bus type architecture, however, it should be understood that any other architectures can also be used to couple components inside memory device 100.

Additionally, the memory device 100 may include a user input module 160. The user input module 160 may enable the user to control operations of the memory device 100. The user input module 160 may include various user input devices, such as keyboard, mouse, touch screen, and the like. In addition, the user input module 160 may include interfaces that can enable external user input devices.

In an embodiment, the memory device 100 may include an audio/video module 150. The audio/video module 150 may include various audio and video devices, such as microphone, display screen, and the like. In addition, the audio/video module 150 may include interfaces that can enable external audio and video devices. The audio/video module 150 can be utilized to play audio data/video data that can be stored in the optical disc 190.

In another embodiment, the memory device 100 may include a network module 170. Furthermore, the memory device 100 may include a wireless communication module 180. The network module 170 and the wireless communication module 180 may enable the memory device 100 to communicate the data stored in the optical disc 190 to other devices.

Figure 2:
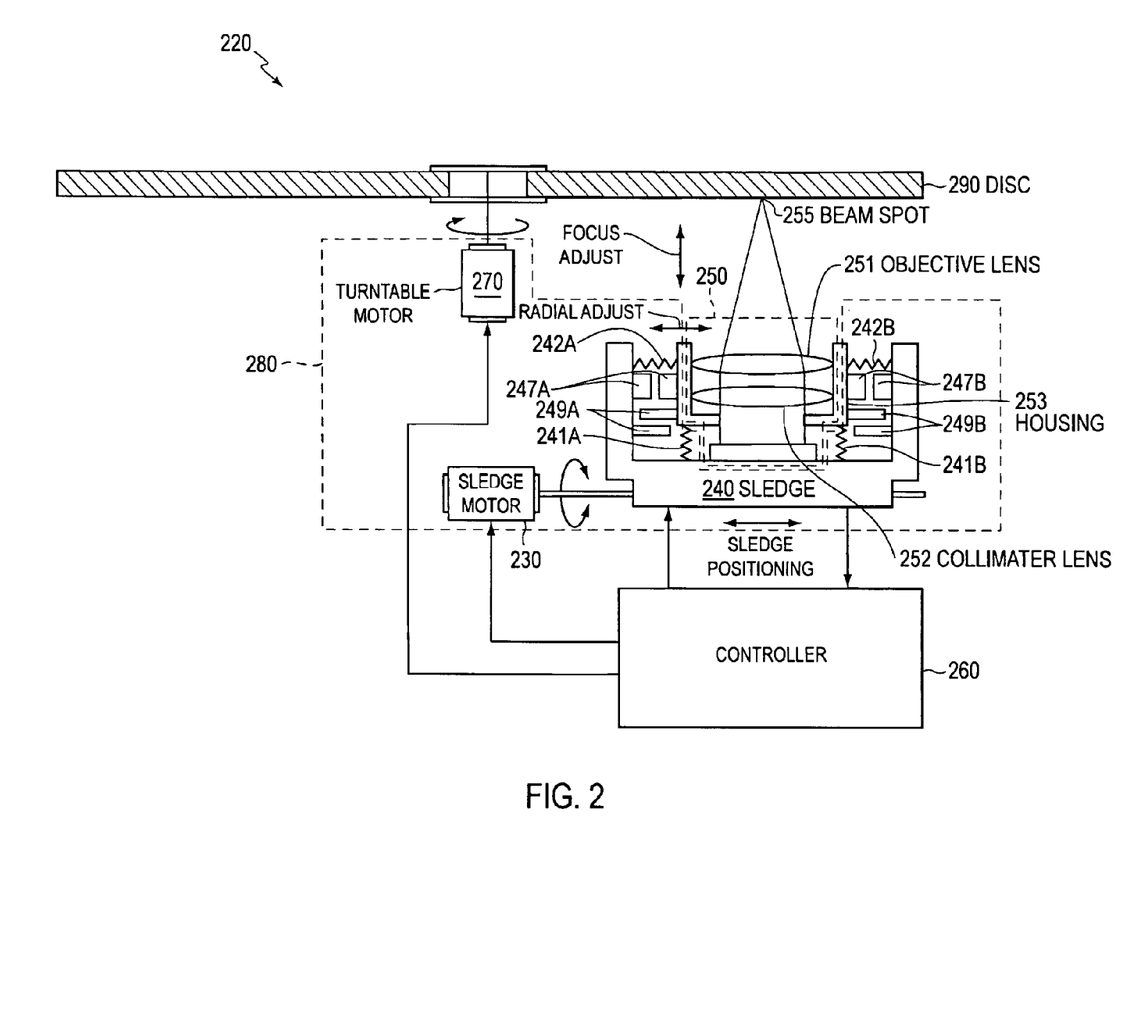
FIG. 2 shows a diagram of an exemplary optical pickup unit (OPU)

FIG. 2 shows an exemplary optical pickup unit (OPU). The OPU 220 may include an optical system 250 that can direct a light beam onto an optical disc 290 and detect a reflected light beam, a driver unit 280 that can include various driving mechanisms, and a controller 260 that can control the driver unit 280 to adjust parameters of the optical system 250. These elements can be coupled together as shown in FIG. 2.

The optical system 250 may include a light emitting device that can emit a light beam. Further, the optical system 250 may include various optics that can form the light beam into an incident light beam to a location of the optical disc 290. The incident light beam can be reflected. The reflected light beam can be guided by various optics to a detector. As described above, an intensity of the reflected light beam can correspond to information stored at the location of the optical disc 290.

However, various other factors of the optical system 250 may affect the intensity of the reflected light beam, which can induce read errors, and affect reading qualities. For example, the optical system 250 may include an objective lens 251 that can focus a parallel light beam into an optical spot on a layer of the optical disc 290 that contains data, such as in form of pits and lands. The objective lens 251 may have an optic parameter, such as focus, that can determine a distance of the objective lens 251 to the layer of the optical disc 290. However, due to various reasons, such as aberrations in the optical spot, shapes of the pits, and the like, it may be preferred that the layer is off the focus of the objective lens 251 to achieve a high reading quality. Generally, a parameter, such as focus offset, can be used to adjust an off distance of the layer to the focus of the objective lens 251.

In another example, the optical system 250 may include a collimator lens 252 that can parallel the emitted light beam. A position of the collimator lens 252 can determine a light intensity that can be projected to the optical disc 290, which can affect the intensity of the reflected light beam, and further affect the reading qualities.

In another example, generally, the incident light beam may not be perpendicular to the surface of the optical disc 290. The various optics may tilt the incident light beam to form a tilt angle between the incident light beam and the reflected light beam. The tilt angle may vary due to various reasons, such as particles on a supporting plate of the optical disc 290. The tilt angle variation may result in variations of the intensity of the reflected light beam, and further affect the reading quality.

In another example, generally, the incident light beam can be controlled to follow a center of a data track, which can be perpendicular to a radial direction of the optical disc 290. However, it may be preferred that the incident light beam can be off the center in the radial direction due to various reasons. Therefore, a parameter, such as radial offset, which describes a distance of the incident light beam to the center of the data track, may need to be calibrated to achieve a high reading quality.

The driver unit 280 may include various mechanisms that can adjust parameters of the optical system 250, such as focus offset, radial offset, collimator position, tilt angle, and the like.

In an example, a focus offset can be adjusted by a mechanism of spring coils and magnets. As shown in FIG. 2, the mechanism can include spring coils 241A-B and magnet pairs 249A-B. The spring coils 241A-B and the magnet pairs 249A-B can vary a vertical position of a housing 253 that holds the objective lens 251. For example, a common mode electrical voltage to the magnet pairs 249A-B can be adjusted according to a focus offset. Accordingly, the magnet pairs 249A-B can apply an adjusted magnetic force at the vertical direction. When the adjusted magnetic force is not balanced with a restoring force of the spring coils 241A-B, the spring coils 241A-B may be stretched or compressed. Thus, the vertical position of the housing 253 can vary, and then the distance between the objective lens 251 and the surface of the optical disc 290 can vary accordingly.

Additionally, the spring coils 241A-B and the magnet pairs 249A-B can be used to adjust the tilt angle. For example, a differential mode electrical voltage to the magnet pairs 249A-B can be adjusted according to the tilt angle. Accordingly, the magnet pairs 249A-B can apply unbalanced magnetic forces to the housing 253 at the vertical direction. For example, the magnet pair 249A can apply a larger magnetic force, while the magnet pair 249B can apply a smaller magnetic force. The spring coils 242A-B may be stretched or compressed differently to balance forces to the housing 253. Thus, the housing 253 can be tilted, which can vary the tilt angle of the incident light beam to the reflected light beam accordingly.

In another example, a radial offset can be adjusted by a first mechanism of a sledge motor and a second mechanism of spring coils and magnets. The first mechanism can include a sledge motor 230 and a sledge 240 coupled together as shown in FIG. 2. The sledge motor 230 can drive the sledge 240 to move in the radial direction. The sledge 240 can hold the housing 253, which holds the optical system 250. The first mechanism can adjust the radial offset in a wide range.

The second mechanism can include the spring coils 242A-B, and magnet pairs 247A-B. The spring coils 242A-B and the magnet pairs 247A-B can vary a radial position of the housing 253 that holds the objective lens 251. For example, a differential mode electrical voltage to the magnet pairs 247A-B can be adjusted according to the radial offset. Accordingly, the magnet pairs 247A-B can apply unbalanced magnetic forces to the housing at the radial direction. For example, the magnet pair 247A can apply a larger magnetic force, while the magnet pair 247B can apply a smaller magnetic force. The spring coils 242A-B may be stretched or compressed to balance forces to the housing 253. Thus, the radial position of the housing 253 can vary, and then the radial position of the incident light beam can vary accordingly.

The controller 260 can determine an optimum value set for parameters of the optical system 250 according to the disclosure, and control the driver unit 280 accordingly. As described above, various parameters of the optical system 250 can affect a reading quality. Additionally, the various parameters can be correlated.

In a sequential calibration technique, each of the various parameters may be adjusted sequentially to find a value to achieve an optimum reading quality. However, due to the correlation of the various parameters, the sequential calibration technique may not be able to achieve the optimum reading quality.

In another calibration technique, every value combination of the various parameters can be tested to find an optimum value set. This calibration technique can be time consuming and not efficient. For example, this calibration technique may need to test 64 combinations for a three-parameter and four-value experiment.

The disclosure can provide a method for the controller 260 to efficiently determine parameter values for controlling the optical system 250. The controller 260 may determine parameters that can be adjusted to achieve the high reading quality. Then, the controller 260 may define value sets for the parameters to control the optical system 250 reading the optical disc 290. The value sets can be carefully designed to reduce a number of sets to improve efficiency while have enough sets to reveal correlation. For example, the value sets can be designed according to design of experiment (DOE) methodology. Subsequently, the optical system 250 may read the optical disc 290 with the parameters set at the value sets. Further, the controller 260 may receive performance signals corresponding to the optical system 250 being operated at the value sets. Consequently, the controller 260 can set the parameters of the optical system 250 for reading the optical disc 290 based on the performance signals.

It should be understood that the controller 260 can perform a calibration process before an officially reading of the optical disc 290. Additionally, the controller 260 can perform the calibration process during reading of the optical disc 290, such as being triggered by an unacceptable reading error.

Figure 3:
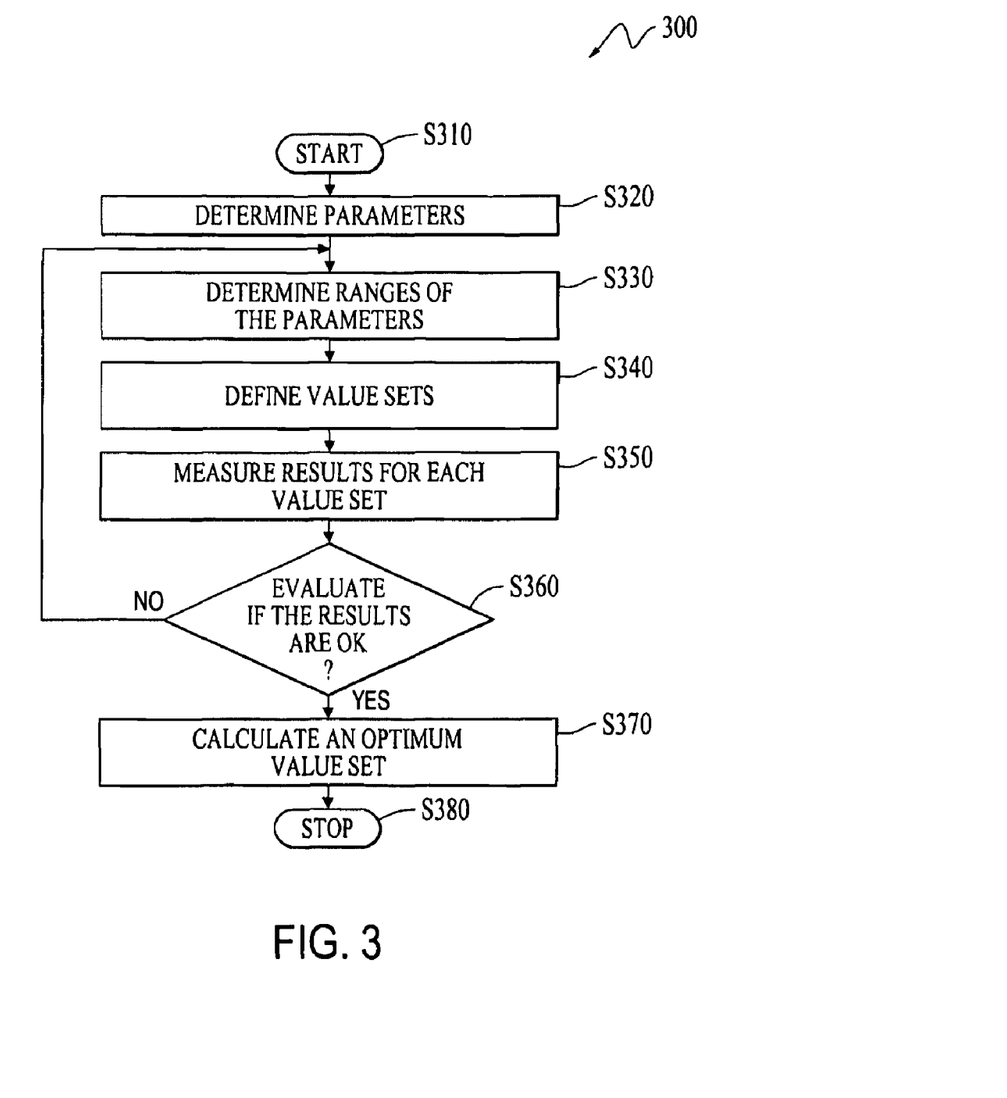
FIG. 3 shows a flow chart outlining an exemplary calibration process.

FIG. 3 shows a flowchart outlining an exemplary process to calibrate an optimal value set of parameters for the optical system 250 to read the optical disc 290. The process starts at step S310 and proceeds to step S320.

In step S320, the controller 260 may determine parameters that can be adjusted to achieve a high reading quality. As described above, various parameters can affect the reading quality. For example, the focus offset, the radial offset, the tilt angle, the collimator position, and the like, of the optical system 250 can affect the reading quality. For another example, a gain of an amplifier, a bandwidth of an equalizer, and the like, of the read channel that can extract a digital signal from the signal detected by the optical system 250 can affect the reading quality.

In an example, the controller 260 may decide to adjust parameters of the optical system 250. In another example, the controller 260 may decide to adjust parameters of the read channel. In a third example, the controller 260 may decide to adjust both parameters of the optical system 250 and parameters of the read channel. Subsequently, the process proceeds to step S330.

In step S330, the controller 260 may determine ranges for the determined parameters. In an example, the controller 260 may determine a range for a determined parameter that the optical drive 250 is workable. In another example, the controller may determine a smaller range comparing to an adjustable range for the determined parameter. For example, according to a known status of the optical drive 250, the controller 260 may determine that an optimum value for the determined the parameter may fall into the smaller range. For another example, the controller 260 may prefer smaller ranges to make modeling easy and accurate. Generally, a simple model, such as a linear model, a parabolic model, and the like, can be used for modeling in a smaller range with a high accuracy. Therefore, a smaller range can be determined to increase efficiency and ease of modeling. Then, the process proceeds to step S340.

In step S340, the controller 260 may define value sets for the determined parameters. The value sets can be carefully defined to reduce a number of sets to increase efficiency. Further, the value sets can be defined to have enough sets to model a correlation of the parameters. In an embodiment, the controller 260 may design the value sets according to a design of experiment (DOE) methodology. For example, the controller 260 may design the value sets according to an orthogonal methodology, such as using a Taguchi table. The process then proceeds to step S350.

In step S350, the controller 260 may control the driver unit 280 to adjust the optical system 250 according to each value set to read the optical disc 290. Further, the optical system 250 can detect reading signals corresponding to the value sets. The reading signals can be used to measure performance signals.

The performance signals may include various quality factors, such as mean square of phase errors (MSE), jitter, radial error amplitude, pseudo sync count, main beam push pull amplitude (MBPP), side beam push pull amplitude (SBPP), differential push pull amplitude (DPP), viterbi margin metric (VMM), wobble quality metric, adip error and the like. In an embodiment, a performance signal can include a weighted combination of a plurality of quality factors. The process then proceeds to step S360.

In step S360, the controller 260 can make a judgment if the results are acceptable. For example, the controller 260 may examine if there is a value set of the parameters that can achieve a threshold performance. If the results are acceptable, the process proceeds to step S370. Otherwise, the process returns to step S330 to modify the ranges of the parameters.

In step S370, the controller 260 may calculate an optimum value set. For example, the controller 260 may choose one value set from the value sets. The chosen value set may have a better performance over the other sets. In another example, the controller 260 may use a numerical interpolation method to calculate the optimum value set. The controller 260 may build a model, such as a linear model, a parabolic model, and the like, based on the performance signals. Further, the controller 260 may determined the optimum value set based on the model, such as a value set that can achieve a best performance. The optimum value set can be used to control the optical drive 250 to read the optical disc 290. Then, the process proceeds to step S380 and terminates.

Figure 4:
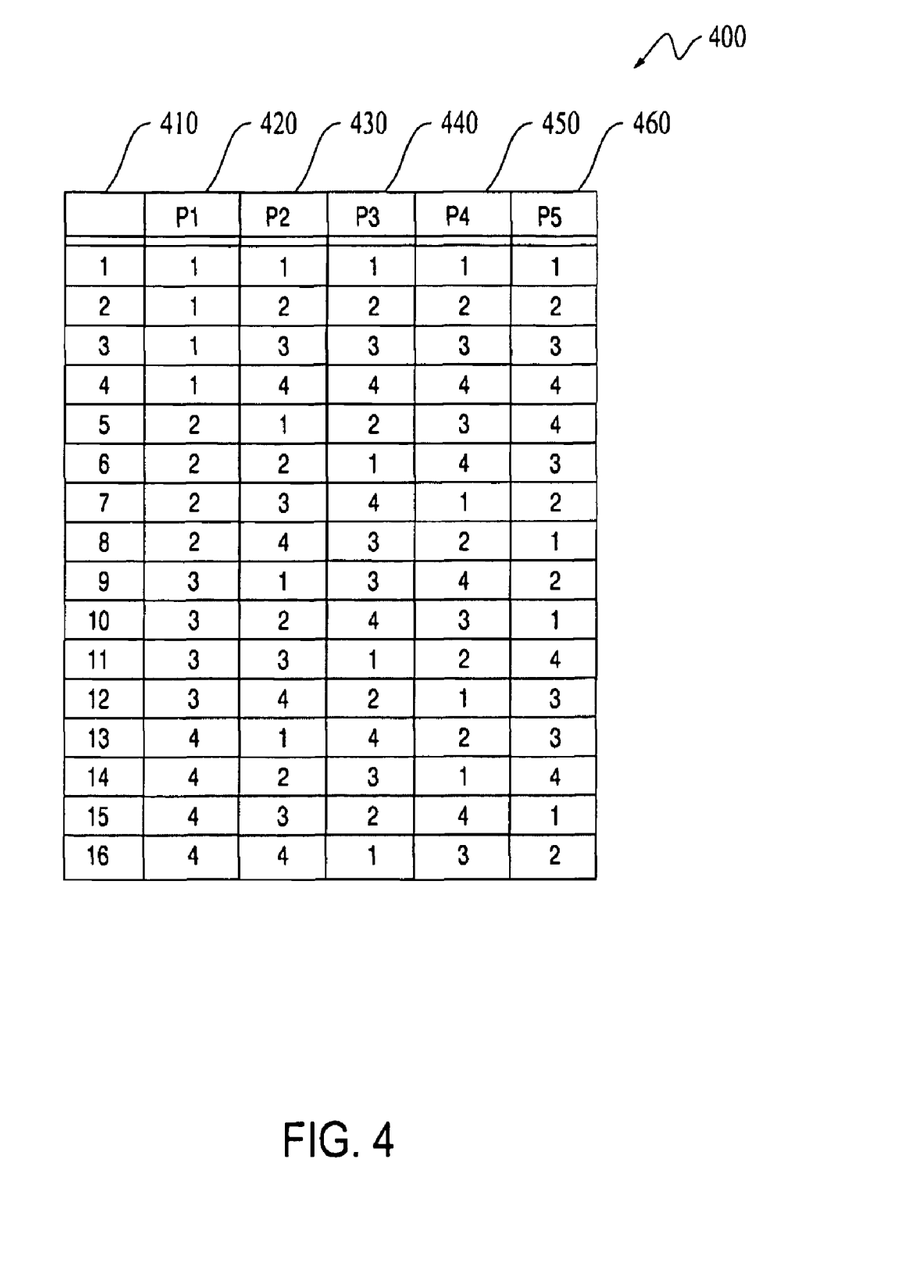
FIG. 4 shows an exemplary Taguchi table.

FIG. 4 shows an exemplary Taguchi table. The Taguchi table 400 can use 16 sets for an experiment of up to 5 parameters that each parameter can include four values indicated by 1-4. The Taguchi table 400 can include Field 410 that can index the sets, and Fields 420-460 for five parameters.

In an example, the Taguchi table 400 can be used to design an experiment for three parameters. For each parameter, four values can be chosen for the experiment. Further, three Fields of the Fields 420-460, such as Fields 420-440, can be used for the three parameters to indicate which values should be used in each set. According to the Taguchi table 400, the experiment for the three parameters may require 16 sets of parameters that each set of parameters can be indicated by a row indexed by Field 410. For example, set 8 can include value 2 of a first parameter, value 4 of a second parameter, and value 3 of a third parameter. As can be seen, the number of sets can be much smaller than a full combination technique, which may require 64 sets for a three-parameter and four-value experiment. Therefore, a high efficiency can be achieved.

Figure 5A:
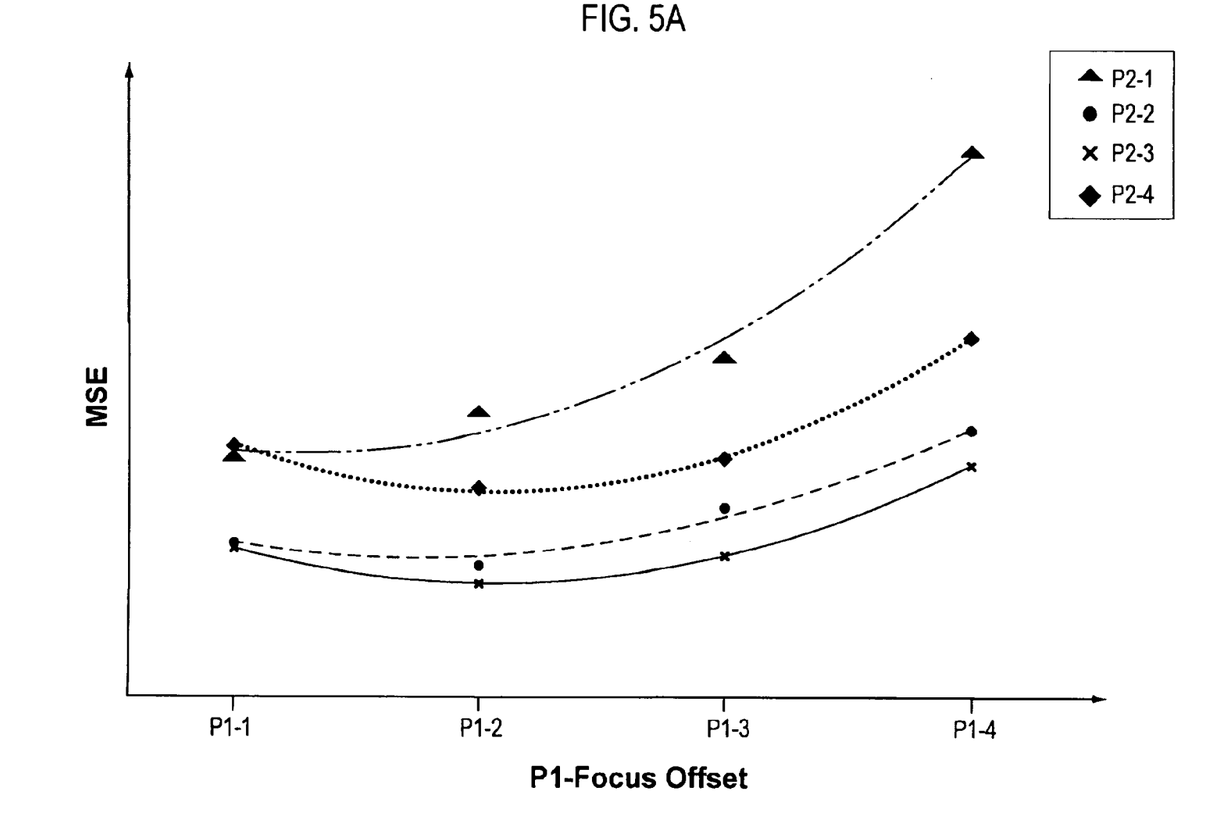
FIGS. 5A-B show an example of calculating an optimum value set.
Figure 5B:
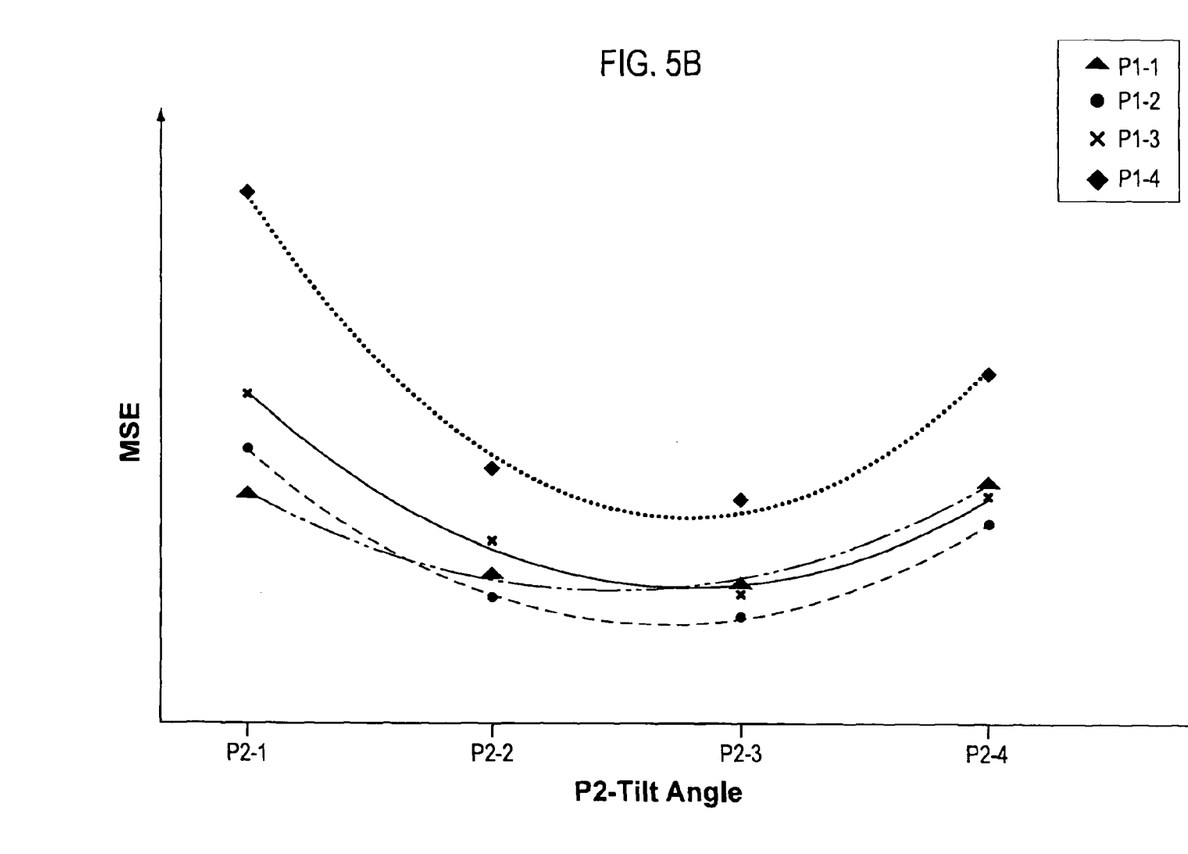

FIGS. 5A-B show an example of calculating an optimum value set for a 2-parameter experiment. The 2-parameter experiment can include a first parameter focus offset, and a second parameter tilt angle. FIG. 5A shows a relationship of a performance signal MSE and the first parameter focus offset for an optical drive to read an optical disc. As can be seen, FIG. 5A can include the performance signal MSE measured for 16 value sets as indicated by points. Further, the 16 points can be categorized into 4 groups according to the values of the second parameter tilt angle. Subsequently, each group can be modeled by a parabolic line. Then, the parabolic lines can be used to calculate an optimum value of the first parameter focus offset, such as a value that can achieve a minimum MSE.

FIG. 5B shows a relationship of the performance signal MSE and the second parameter tilt angle. As can be seen, FIG. 5B can include the performance signal MSE measured for the 16 sets of values as indicated by points. Further, the 16 points can be categorized into 4 groups according to the values of the first parameter focus offset. Subsequently, each group can be modeled by a parabolic line. Then, the parabolic lines can be used to calculate an optimum value of the second parameter tilt angle, such as a value that can achieve a minimum MSE.

Additionally, an optimum value set, which can include the optimum value of the first parameter and the optimum value of the second parameter, can be used to drive the optical drive to read the optical disc. The performance signal MSE can be measured to verify if the optimum value set can achieve an acceptable performance.

For ease and clarity of explanation, the example uses the parabolic lines to calculate the optimum value set. It should be understood that a paraboloid can be used to calculate the optimum value set. Further, it should be understood that the exemplary method can be extended to more than 2 parameters.

It should be understood that for a general understanding of the features of the disclosure, reference is made to an optical drive that reads an optical disc for the sake of clarity. However, it should be appreciated that the method disclosed herein, as discussed above, can be equally applied to a hard drive that reads a hard disk. The hard drive can include a controller that can execute a calibration method similar to the above to calibrate an optimum value set for parameters of the hard drive. More specifically, the controller may define value sets for setting the parameters to read the hard disk. Further, the controller may receive performance signals corresponding to the hard drive being operated at the value sets. Subsequently, the controller may determine the optimum value set based on the performance signals, and set the parameters of the hard drive according to the optimum value set to read the hard disk.

While the invention has been described in conjunction with the specific exemplary embodiments thereof, it is evident that many alternatives, modifications, and variations will be apparent to those skilled in the art. Accordingly, exemplary embodiments of the invention as set forth herein are intended to be illustrative, not limiting. There are changes that may be made without departing from the spirit and scope of the invention.

The invention claimed is:

1. A method for reading a memory medium, comprising:
   defining two or more value sets for parameters of a device to read the memory medium by selecting only at most one-quarter of a full combination set of the parameters according to a design of experiments methodology including a Taguchi table, wherein the parameters comprise at least one of a focus offset, a radial offset, a tilt angle, a collimator position, a gain of an amplifier and a bandwidth of a preamplifier;
   reading the memory medium using the two or more value sets for the parameters;
   receiving performance signals corresponding to operation of the device having the value sets for the parameters, respectively; and
   setting the parameters for reading the memory medium based on the performance signals.

2. The method according to claim 1, further comprising:
   determining an optimum value set based on the performance signals.

3. The method according to claim 2, further comprising:
   verifying the optimum value set of the parameters by reading the memory medium with the parameters of the device set at the optimum value set.

4. The method according to claim 2, wherein determining the optimum value set based on the performance signals further comprises:
   selecting the optimum value set from the value sets based on the performance signals.

5. The method according to claim 2, wherein determining the optimum value set based on the performance signals, further comprises:
   building a model of the performance signals to the parameters; and
   determining the optimum value set based on the model.

6. The method according to claim 5, wherein the model comprises at least one of a linear model, a parabolic model and a paraboloid model.

7. The method according to claim 1, wherein the performance signals comprise at least one of a mean square of phase errors (MSE), a jitter, a radial error amplitude, a pseudo sync count, main beam push pull amplitude (MBPP), side beam push pull amplitude (SBPP), differential push pull amplitude (DPP), viterbi margin metric (VMM), wobble quality metric, and adip error.

8. The method according to claim 1, wherein the performance signals comprise a weighted combination of at least one of a mean square of phase errors (MSE), a jitter, a radial error amplitude, a pseudo sync count, main beam push pull amplitude (MBPP), side beam push pull amplitude (SBPP), differential push pull amplitude (DPP), viterbi margin metric (VMM), wobble quality metric, and adip error.

9. The method according to claim 1, wherein the memory medium comprises at least one of a hard disk, a high-density blue laser disk, a CD and a DVD.

10. An apparatus for reading a memory medium, comprising:
    a reading unit configured to receive signals from the memory medium;
    a controller coupled to the reading unit, wherein the controller is configured to define two or more value sets for parameters of the reading unit to read the memory medium by selecting only at most one-quarter of a full combination set of the parameters according to a design of experiments methodology including a Taguchi table, wherein the parameters comprise at least one of a focus offset, a radial offset, a tilt angle, a collimator position, a gain of an amplifier and a bandwidth of a preamplifier, set the parameters of the reading unit according to the value sets, receive performance signals corresponding to operation of the reading unit having the parameters set at the value sets, and set the parameters of the reading unit for reading the memory medium based on the performance signals; and
    a driver unit coupled to the controller, the driver unit configured to cause mechanical adjustment of the reading unit to change at least one of the parameters of the reading unit.

11. The apparatus according to claim 10, wherein the controller is further configured to determine an optimum value set based on the performance signals.

12. The apparatus according to claim 11, wherein the controller is further configured to select the optimum value set from the value sets based on the performance signals.

13. The apparatus according to claim 11, wherein the controller is further configured to build a model of the performance signals to the parameters, and determine the optimum value set based on the model.

14. The apparatus according to claim 13, wherein the model comprises at least one of a linear model, a parabolic model and a paraboloid model.

15. The apparatus according to claim 10, wherein the performance signals comprise at least one of a mean square of phase errors (MSE), a jitter, a radial error amplitude, a pseudo sync count, main beam push pull amplitude (MBPP), side beam push pull amplitude (SBPP), differential push pull amplitude (DPP), viterbi margin metric (VMM), wobble quality metric, and adip error.

16. The apparatus according to claim 10, wherein the performance signals comprise a weighted combination of at least one of a mean square of phase errors (MSE), a jitter, a radial error amplitude, a pseudo sync count, main beam push pull amplitude (MBPP), side beam push pull amplitude (SBPP), differential push pull amplitude (DPP), viterbi margin metric (VMM), wobble quality metric, and adip error.

17. The apparatus according to claim 10, wherein the memory medium comprises at least one of a hard disk, a CD, and a DVD.

18. A processor for calibrating a device to read a memory medium, comprising:
  an interface being configured to provide a value set for setting parameters of the device, and receive signals from the device; and
  a processor unit coupled to the interface, the processor unit being configured to define two or more value sets for the parameters of the device to read the memory medium by selecting only at most one-quarter of a full combination set of the parameters according to a design of experiments methodology including a Taguchi table, wherein the parameters comprise at least one of a focus offset, a radial offset, a tilt angle, a collimator position, a gain of an amplifier and a bandwidth of a preamplifier, transmit the two or more value sets to the interface respectively, determine performance signals from the signals corresponding to operation of the device having the parameters set at the value sets, determine the parameters of the device for reading the memory medium based on the performance signals, and cause mechanical adjustment of the device to change at least one of the parameters of the device.

19. The processor according to claim 18, wherein the processor unit is further configured to determine an optimum value set based on the performance signals.

20. The processor according to claim 19, wherein the processor unit is further configured to select the optimum value set from the value sets based on the performance signals.

21. The processor according to claim 19, wherein the processor unit is further configured to build a model of the performance signals to the parameters, and to determine the optimum value set based on the model.

22. The processor according to claim 21, wherein the model comprises at least one of a linear model, a parabolic model and a paraboloid model.

23. The processor according to claim 18, wherein the performance signals comprise at least one of a mean square of phase errors (MSE), a jitter, a radial error amplitude, a pseudo sync count, main beam push pull amplitude (MBPP), side beam push pull amplitude (SBPP), differential push pull amplitude (DPP), viterbi margin metric (VMM), wobble quality metric, and adip error.

24. The processor according to claim 18, wherein the performance signals comprise a weighted combination of at least one of a mean square of phase errors (MSE), a jitter, a radial error amplitude, a pseudo sync count, main beam push pull amplitude (MBPP), side beam push pull amplitude (SBPP), differential push pull amplitude (DPP), viterbi margin metric (VMM), wobble quality metric, and adip error.

25. The processor according to claim 18, wherein the memory medium comprises at least one of a hard disk, a high-density blue laser disk, a CD, and a DVD.

26. A device, comprising
  a processor configured to process data from a memory medium;
  a reading unit coupled to the processor, the reading unit being configured to read the data from the memory medium and provide the data to the processor;
  a controller coupled to the reading unit, the controller being configured to define two or more value sets for parameters of the reading unit to read the memory medium by selecting only at most one-quarter of a full combination set of the parameters according to a design of experiments methodology including a Taguchi table, wherein the parameters comprise at least one of a focus offset, a radial offset, a tilt angle, a collimator position, a gain of an amplifier and a bandwidth of a preamplifier, set the parameters of the reading unit according to the value sets, receive performance signals corresponding to operation of the reading unit having the parameters set at the value sets, and set the parameters of the reading unit for reading the memory medium based on the performance signals; and
  a driver unit coupled to the controller, the driver unit configured to cause mechanical adjustment of the reading unit to change at least one of the parameters of the reading unit.

27. The method according to claim 1, wherein defining the two or more value sets of the parameters for reading the memory medium further comprises:
  defining at least three parameters for reading the memory medium.

* * * * *